United States Patent

[11] 3,633,443

[72] Inventor Robert J. Schussler
 Union, N.J.
[21] Appl. No. 29,110
[22] Filed Apr. 16, 1970
[45] Patented Jan. 11, 1972
[73] Assignee Robert J. Schussler
 Seminole, Fla.

[54] ROTARY WORKTABLE
 10 Claims, 5 Drawing Figs.
[52] U.S. Cl. .................................................. 74/822
[51] Int. Cl. .................................................. B23b 29/24
[50] Field of Search .................................................. 74/827,
 822, 817, 816, 813, 84, 112, 116, 122

[56] References Cited
 UNITED STATES PATENTS
 2,967,440 1/1961 Hunter ......................... 74/817
 3,533,309 10/1970 Pityo et al. ................... 74/827 X

*Primary Examiner*—William F. O'Dea
*Assistant Examiner*—F. D. Shoemaker
*Attorney*—Edward Goldberg ABSTRACT: A rotary worktable includes a ring member rotatably supported in a housing and a work-holding platform mounted on the ring. The ring includes two sets of radially positioned bearings extending from one circumferential surface and riding respectively on upper and lower annular surfaces within the housing. The radial bearings provide rotation of the ring about a central vertical axis with minimum friction while maintaining precise horizontal alignment. A further set of bearings, positioned around the opposite circumference of the ring, rides on a corresponding annular vertical surface of the housing to maintain an axial disposition and prevent horizontal movement. The rotary worktable elements form an integral unit which is incorporated in a machine used for various manufacturing or assembly operations performed at stations around the periphery of the platform. A common drive mechanism is coupled to the ring member and the entire machine to provide rotation and movement of all elements in a synchronized manner.

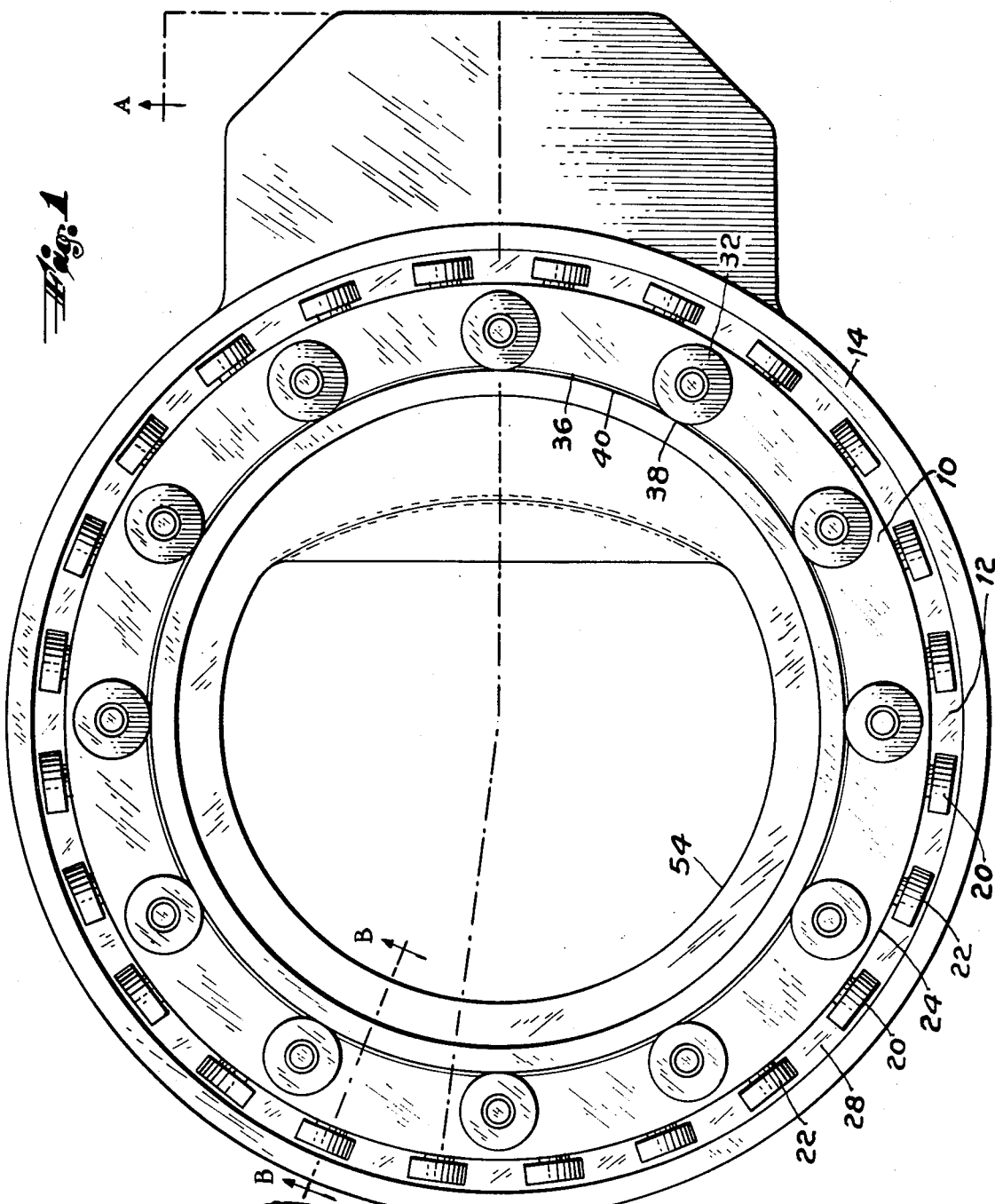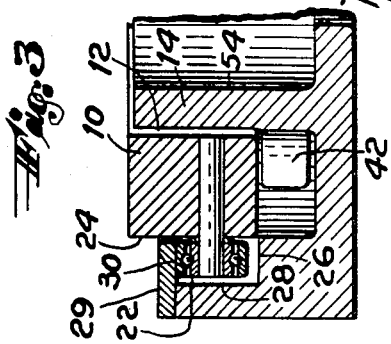

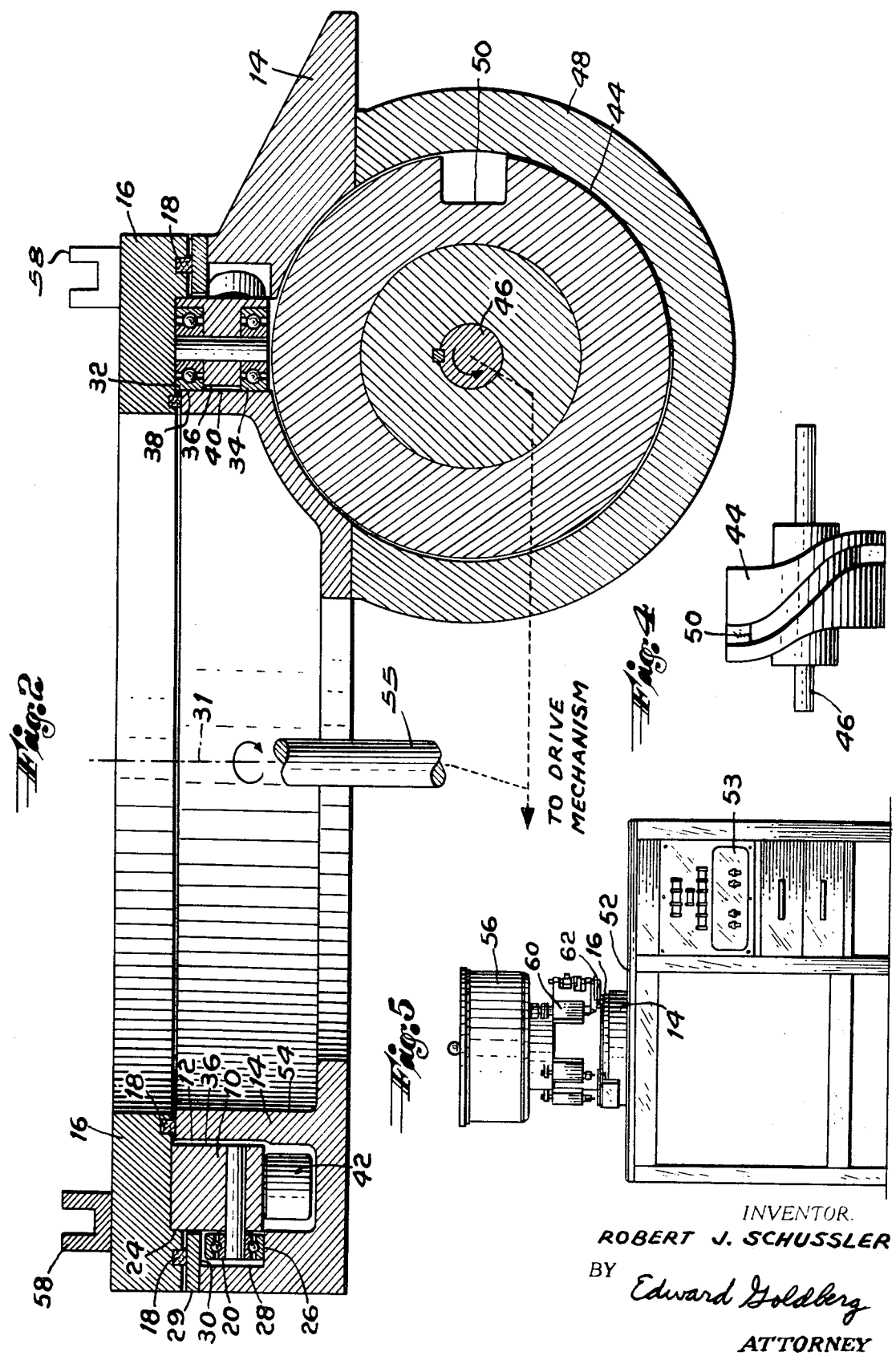

ROTARY WORKTABLE

BACKGROUND OF THE INVENTION

1. Field of the Invention

This invention relates to a rotary worktable for automatic machinery and particularly to an improved simplified stable mounting and drive mechanism to provide precise positioning of the table with reduced friction and longer life.

2. Brief Description of the Prior Art

Rotary worktables have generally been used in conjunction with automatic indexing mechanisms which provide an intermittent rotation and stoppage of a platform to establish a number of work stations at different spaced positions around the periphery of the platform. Various components are automatically fed to the work stations at predetermined intervals to enable manufacturing or assembling operations to be performed in a rapid continuous or repetitive manner. An example of a known device of this type is described in U.S. Pat. No. 3,408,883 issued Nov. 5, 1968. An important requirement of such apparatus is to have the platform precisely and securely positioned to provide the desired synchronized operations on a stable base which is easily rotatable. For this purpose previous rotary tables have been mounted on bearings and supporting elements which were incorporated into the machine housing or base. Such a structure however, could not be employed as an integral rotatable unit that was interchangeable for use in other similar machines.

SUMMARY OF THE INVENTION

It is therefore the primary object of the present invention to provide a simplified compact stable rotatable worktable of high efficiency which can be employed with various types of automatic manufacturing machinery.

A further object is to provide an improved support and drive mechanism for a rotatable worktable which incorporates the bearings to provide an integral unit.

This is accomplished by a novel mounting arrangement including a rotatable ring supported within a housing having an annular channel. Two sets of radially positioned bearings are mounted at spaced intervals around a circumferential surface of the ring and ride on upper and lower annular surfaces within the housing channel to provide horizontal alignment and prevent vertical movement of the ring. Another set of bearings around the opposite periphery of the ring contacts an annular vertical surface of the channel to maintain an axial position and prevent horizontal movement. A work platform, having various work stations or part holders positioned around the upper surface, is secured on the ring. A suitable drive, such as a cam-operated indexing mechanism, is connected to rotate the ring within the housing in cooperation with the various other elements of the entire automatic machine. The details of the invention will be more fully understood and other objects and advantages will become apparent in the following description and accompanying drawings.

BRIEF DESCRIPTION OF THE DRAWINGS

FIG. 1 shows a top view of the novel rotatable ring and housing of the present invention with the upper platform and cover portions removed, FIG. 2 is a cross-sectional view of the device taken along section A—A of FIG. 1, including the work platform and cover plate, FIG. 3 is a partial cross-sectional view of the device taken along sections B—B of FIG. 1, without the work platform, FIG. 4 is a front view of an indexing cam used with the invention, and FIG. 5 is a front view of a machine into which the present invention is incorporated.

DESCRIPTION OF THE PREFERRED EMBODIMENT

As shown in FIG. 1 and 2, a rotatable ring 10 is seated in an annular channel 12 in a housing 14. A rotatable work platform 16 or turret, shown in FIG. 2, is secured on an upper end surface of the ring which extends through an open end of the channel. The platform extends horizontally across the ring and housing and rotates with the ring on the housing. Felt seals 18 are disposed in inner and outer annular grooves around the lower surface of the platform and engage the upper surfaces of the housing on each side of the ring. The fibrous material, which adds little friction, provides a seal for internal lubricants and prevents external contaminating particles from entering the channel and spaces between the ring, platform and housing.

The ring 10 is supported in channel 12 of housing 14 on two sets of radially extending bearings 20, 22 rotatably mounted on horizontally disposed shafts and positioned alternately at spaced intervals around the outer circumference 24 of the ring. One set of radial bearings is positioned below the other to engage and ride on a lower surface 26 of an annular track or recess 28 in channel 12. The upper portion of the track is enclosed by a cover plate 29 secured to the housing. The second set of radial bearings 22 rides on an upper surface 30 of the annular track 28 provided by the cover plate, as shown more clearly in FIg. 3. The two sets of bearings rotate on the respective surfaces in opposite clockwise directions for either direction of rotation of the ring about a central vertical axis 31 and cooperate to maintain the ring aligned in a horizontal plane.

A further set of bearings 32, 34 are rotatably mounted within the ring 10 at opposite ends of a plurality of vertical shafts extending between the upper and lower surfaces of the ring and are disposed at spaced intervals adjacent the inner circumference 36 around the ring. Bearings 32, 34 are mounted within the ring so that the diameters extend slightly beyond the inner periphery of the ring at 38 and engage a corresponding annular vertical surface 40 on the inner sidewall of channel 12. The vertically mounted bearings around the inner circumference maintain the ring and platform in position about the central vertical axis 31 and prevent horizontal movement. Mounted at spaced intervals around the lower end surface of ring 10 within channel 12 are a plurality of cam followers 42 which are driven by a cam 44 rotatably mounted on a shaft 46 in a housing 48 below one side of housing 14. As shown in FIG. 4, the cam has a suitably shaped partial circumferential track 50 to engage and drive the cam follower with an intermittent indexing motion so that the rotation of the ring and worktable is periodically halted to permit various assembly or manufacturing operations to take place during each time interval at spaced work stations around the circumference of the table. The shaft 46 is coupled to a suitable drive mechanism including gearing and a chain drive connected to a motor (not shown) which is the common source of power for the entire machine.

As shown in FIG. 5, the housing 14 and work platform 16 are mounted on a supporting base 52 which encloses the drive mechanism and controls 53 for the machine. The central opening 54 in housing 14 shown in FIG. 2 accommodates various other elements such as drive shaft 55, gearing and connecting rod mechanisms which provide the mechanical movements necessary for the manufacturing or assembling operations performed on the worktable. For example, overhead vibratory feeders are rotated within an enclosure 56 for feeding electrical component parts onto work holders 58, shown in FIG. 2, at various circumferential stations on the platform 16. A different step of the assembly operation is then performed at each location during the intermittent stoppage of the platform under respective apparatus, as for example a press mechanism 60 shown in FIG. 5, until the entire process is completed and the assembled component ejected by an eject mechanism 62. Disposition of the various elements through the central opening permits simplification of the entire machine.

In some applications, where no periodic temporary stop motion is required, the cam indexing unit and followers may be replaced by standard gearing or other driving mechanisms to provide a continuous rotation of the worktable. In addition, the same form of rotatable ring member and bearing arrangement may be used as an integral self-contained unit for supporting rotary work platforms in various other types of automatic machinery such as for different assembly or machining operations. The spacing and size of the bearings and dimensions of the ring may likewise vary to suit many different applications.

It may thus be seen that the present invention provides a compact stable rotatable work platform and drive mechanism of reduced friction which can be employed as an integral unit in various types of associated machinery. While only a single embodiment has been described and illustrated, it is apparent that other variations may be made in the particular design and configuration without departing from the scope of the invention as set forth in the accompanying claims.

What is claimed is:

1. A rotary worktable comprising:
    a housing having an annular channel with an opening around one surface;
    a ring member rotatably supported in said channel and having one end surface disposed at said opening;
    first and second sets of radially disposed bearings mounted at spaced intervals around one circumferential surface of said ring member, said first set of said radially disposed bearings being mounted to engage a lower annular surface within said channel and said second set of said radially disposed bearings being mounted to engage an upper annular surface within said channel;
    a third set of bearings mounted at spaced intervals around the opposite circumferential surface of said ring member to engage a corresponding annular sidewall surface within said channel;
    a rotatable work platform positioned on said housing and secured to said ring member on said one end surface, and
    drive means coupled to said ring member to rotate said ring and platform with respect to said housing.

2. The device of claim 1 wherein said radially disposed bearings are rotatably mounted on horizontally positioned shafts extending from the outer circumference of said ring to maintain horizontal alignment of said ring and said third set of bearings are rotatably mounted on vertically disposed shafts within said ring adjacent the inner circumference, the diameters of said third set of bearings extending slightly beyond said inner circumference to engage a vertical sidewall surface within said channel to maintain positioning about a centrally disposed axis.

3. The device of claim 2 wherein said worktable is secured to the upper surface of said ring member, a plurality of cam followers are mounted on the lower surface of said ring member, and said drive means includes a cam indexing mechanism to rotate said cam followers with an intermittent motion and to stop the rotation at spaced positions around said ring and provide work stations at corresponding portions of said work platform.

4. The device of claim 2 wherein said sets of radially disposed bearings engaging upper and lower surfaces are positioned alternately at spaced intervals around said outer circumference.

5. The device of claim 2 including sealing means disposed between said platform and housing to prevent external particles from entering said channel and spaces between said platform and housing and ring.

6. The device of claim 2 including an annular track within said channel, wherein said first set of radially disposed bearings engages a lower surface of said track and said second set engages an upper surface of said track.

7. The device of claim 3 wherein said housing and rotatable work platform are mounted on a base support of an automatic machine, and including component-handling means positioned on said base over said platform, and further drive means for driving said component-handling means, said housing having a central opening accommodating said further drive means, said further drive means being coupled to said indexing mechanism for positioning components at said work stations in synchronism with said indexing mechanism.

8. The device of claim 5 wherein said platform includes annular grooves on the lower surface on each side of said ring, said sealing means being positioned in said grooves for sliding contact with said housing.

9. The device of claim 6 including a cover plate secured on said housing over said annular track and forming said upper surface of said track.

10. The device of claim 7 including a plurality of component holders mounted on said platform at said work stations.

* * * * *